United States Patent Office 3,421,083
Patented Jan. 7, 1969

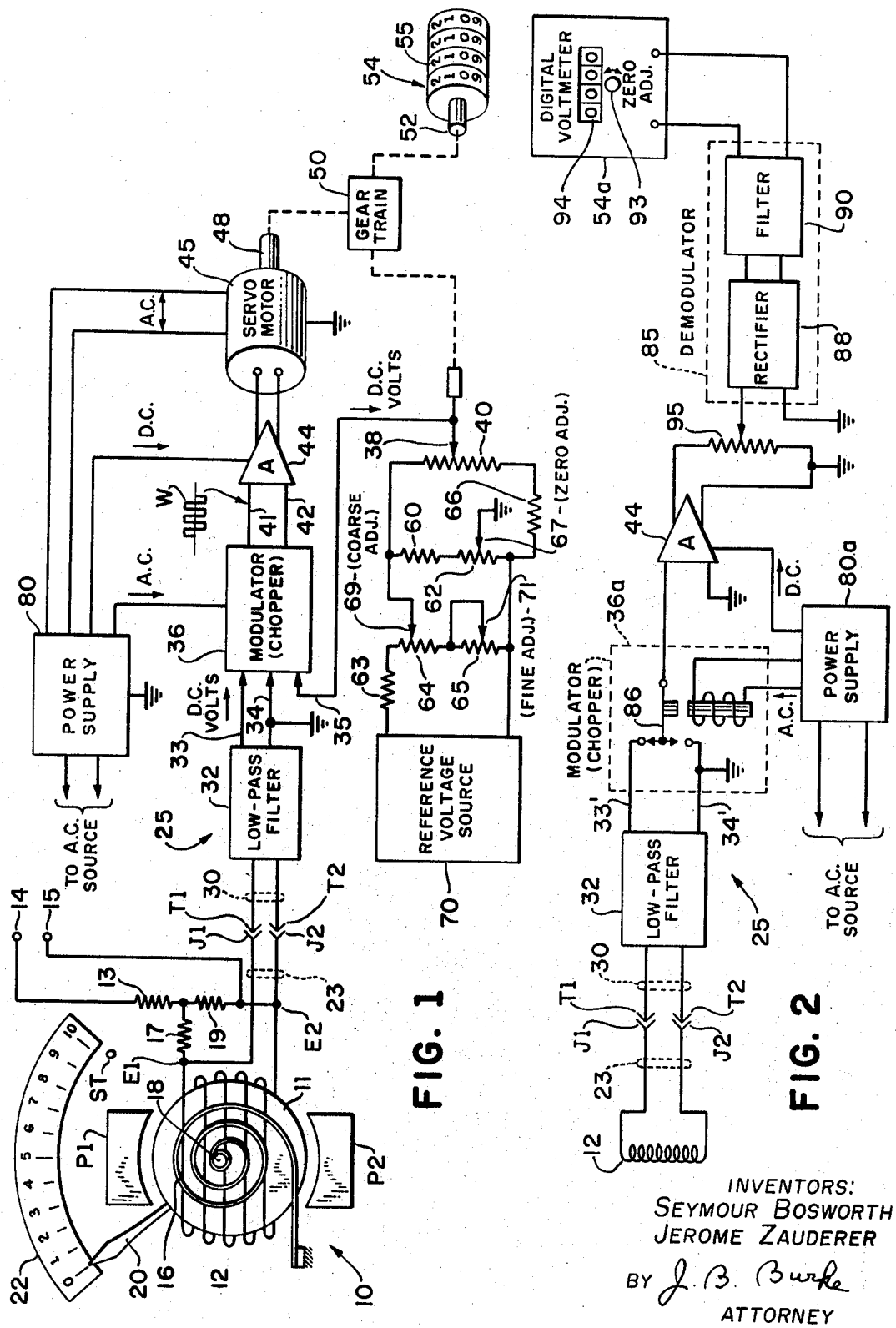

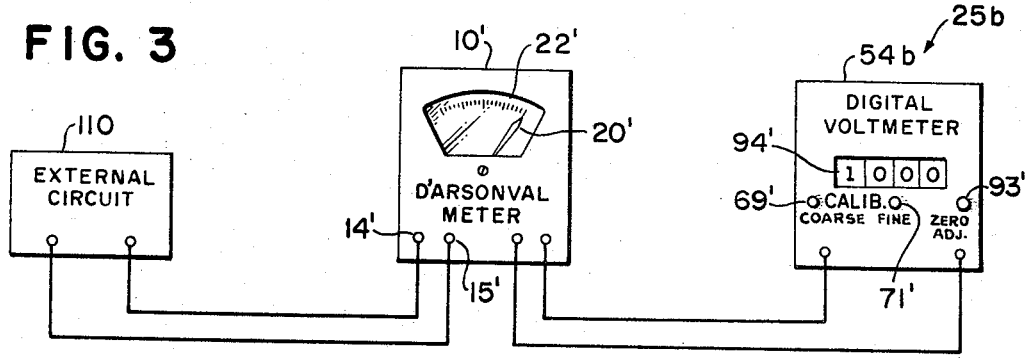
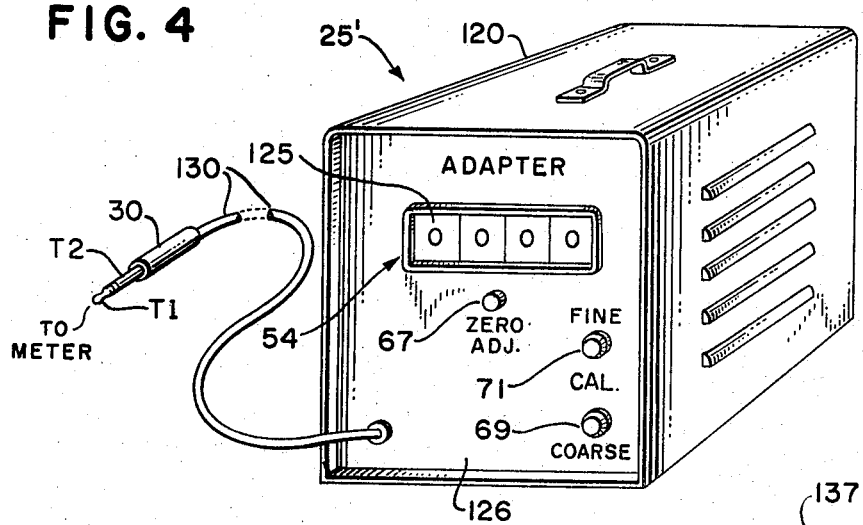
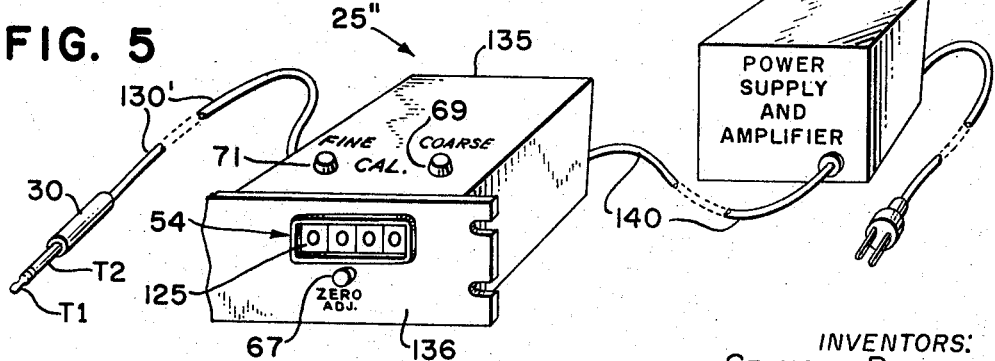

3,421,083
DIGITAL INDICATING DEVICE FOR DC
VOLTAGE SOURCE
Seymour Bosworth, Plainview, and Jerome Zauderer,
Brooklyn, N.Y., assignors to Abbey Electronics Corp.,
Westbury, N.Y., a corporation of New York
Filed Mar. 19, 1965, Ser. No. 441,127
U.S. Cl. 324—99                                              10 Claims
Int. Cl. G01r 17/06

ABSTRACT OF THE DISCLOSURE

A digital indicating adapter for a d'Arsonval meter or other DC voltage source has a modulator to which DC voltage is applied. The modulator produces a square peaked alternating voltage output in response to the applied DC voltage. The alternating voltage is applied to a digital indicating device to produce digital indications corresponding to the applied DC voltage. The digital indicating device can be a multiple disk counter with a servo motor connected to the counter to drive it, the servo motor being driven by the modulator.

---

This invention concerns digital indicating adapters for use with electric meters of the d'Arsonval type.

The d'Arsonval type meter is one of the most frequently used components in the fields of electrical and electronic measurement and instrumentation. This type of meter consists essentially of a permanent magnet having pole pieces shaped in the form of a segment of a cylinder, within which is located a coil wound on an armature free to rotate against the restoring force of a spring. Direct current passing through the coil sets up a magnetic field which interacts with the magnetic field of the permanent magnet to cause rotation of the armature. The angle through which the armature rotates is approximately proportional to the current flowing through the coil. A pointer fixed to the armature indicates this angle of rotation on a dial having a scale appropriately calibrated and marked in terms of the parameter being measured. Although the d'Arsonval meter measures the magnitude of the direct current flowing through its coil, and is often used for this purpose, it is also commonly used with associated components, to measure alternating current, direct voltage and alternating voltage. The scale on the dial face may be calibrated in terms of any of these parameters of voltage or current, or in terms of indirectly related parameters such as "miles per hour," "gallons per minute," "cycles per second," etc.

The usefulness of instruments employing d'Arsonval meters is limited by several factors, some of which are:

(1) Restricted resolution. It is not practicable, in most cases, to have more than fifty scale divisions on the dial; and even laboratory standard meters do not usually have more than one hundred scale divisions. Therefore, measurements can be read with a resolution of only 1% of full scale and can be estimated to no better than ½% or ¼% of full scale.

(2) Tracking error. Because of inhomogeneity in the magnetic fields and other factors, accuracy of indication varies over the whole arc of deflection of the pointer. Typically a meter adjusted and calibrated for perfect accuracy at one point on its scale may have errors of 2% to 5% of full scale value at other points on the scale. Even meters with scales drawn specially for each individual meter movement are accurate only within ½% to %1.

(3) Reading error. There are several inherent sources of reading error:

(a) It is generally not practicable to draw a scale with numbers marking more than ten of the scale divisions. Therefore, in reading the meter, technicians may have to count lines between numbered scale markings. This results frequently in erroneous readings.

(b) Another source of reading error is parallax. With the pointer at a given deflection, different readings will be obtained depending on the distance of the pointer from the scale, and the angle at which the eye views the meter. To overcome this deficiency, a mirror is sometimes incorporated into the dial face. The technician then reads the meter with one eye, while positioning his head so that the pointer and its reflection are coincident. This is a great inconvenienec since it requires that the lighting conditions be favorable; that the technician bring his head close to the meter; and that he read the meter with one eye open and one eye closed.

(c) Whenever the pointer comes to rest between scale lines or divisions, the reading must be estimated. This involves a subjective process, and may result in an error in reading of as much as half a scale division.

The present invention is directed at overcoming the above difficulties and disadvantages, while still making use of the d'Arsonval meter. Basically the invention involves an adapter which can be connected by means of a plug and jack or other connecting means, across the moving coil of a d'Arsonval meter, to provide a direct digital readout. Means are provided whereby the full-scale indication of the digital readout can be set to correspond to the full-scale reading of the d'Arsonval meter to which the adapter is connected. All three types of reading errors described above are thus completely eliminated, since the technician merely reads the Arabic numerals in the decimal system displayed in the readout window of the adapter. Also since the readout will display at least three digits, a change of one unit in the last place indicates, without the need to estimate, a change of 0.1% of full-scale. Thus the resolution of reading is increased by a factor of 10. The accuracy of the device is of the order of one or two digits in the last place, or 0.1% to 0.2% of full-scale, which represents an improvement factor of 5 to 10 over the basic accuracy of the d'Arsonval meter.

It is therefore a principal object of the invention to provide an adapter which can be connected across the moving coil of a d'Arsonval meter to provide a direct decimal digital readout of current passing through the meter, with greater accuracy than is obtainable from reading the pointer and scale of the meter.

Another object is to provide an adapter as described, wherein the digital readout is provided by a multiple disk digital counter or by a digital voltmeter of the solid state, stepping switch or relay type.

Other and further objects and advantages of the invention will become apparent from the following detailed description taken together with the drawing, wherein:

FIGS. 1, 2, and 3 are diagrams of adapters embodying the invention.

FIG. 4 is a perspective view of an adapter housed in a single cabinet.

FIG. 5 is a perspective view of an assembly in which the adapter is housed in two interconnected units.

Referring first to FIG. 1, there is shown schematically a d'Arsonval meter 10 having an armature 11 rotatable between fixed, permanent magnet poles P1, P2. Wound on the armature is a coil 12 having opposite ends E1, E2 connected to external terminals 14, 15 of the meter via series resistors 13, 17 and shunt resistor 19. A coil spring 16 engaged with the supporting shaft 18 of the armature biases the pointer 20 carried by the armature to "0" on the arcuate graduated meter scale 22. The spring restores the armature and pointer to zero position when current passing through the coil via terminals 14, 15 from an external load circuit is cut off. To the extent described, the meter 10 is conventional.

According to the invention, the meter is provided with a jack 23 having terminals J1, J2 connected to ends of coil 12. Furthermore, in accordance with the invention, there is provided adapter 25 arranged for use with meter 10. The adapter has a pair of input terminals T1, T2 which may be terminals of a plug 30 that can be inserted into jack 23 so that terminals T1, T2 are connected electrically directly to opposite ends of coil 12. Terminals T1, T2 may instead be a pair of clip leads, solderable wires or other suitable circuit attachable to ends E1, E2 of coil 12. The terminals T1, T2 are floating with respect to earth ground, but one terminal may be grounded.

The D.C. voltage developed across coil 12 is applied through terminals T1, T2 to a low-pass filter 32 and thence to inputs 33, 34 of a modulator 36. The filter attenuates any A.C. component which may be present in the D.C. voltage passed to the modulator. Another input 35 of the modulator is connected to arm 38 of potentiometer 40. Output terminals 41, 42 of the modulator are connected to servo amplifier 44. This servo amplifier has its output connected to servo motor 45.

Shaft 48 of the servo motor is coupled to the arm 38 of the potentiometer via a suitable gear train 50. The shaft 48 is also coupled via the gear train 50 to shaft 52 of a mechanical rotating disk counter 54. The counter is shown as having four disks 55 on each of which are ten sequential numerals "0" to "9."

Motor 45 drives the potentiometer arm in such a direction as to bring the arm to a point at which the voltage at the arm equals the signal voltage applied to the modulator at terminals 33, 34. At this point the net voltage input to the modulator is a null and there is no further signal output from the servo amplifier 44 to drive the motor 45. At this point counter disks 55 will display a number corresponding to the voltage applied to terminals 33, 34. This constitutes the desired digital readout corresponding to the pointer indication on meter scale 22.

The gearing 50 between the motor 45, potentiometer 40 and counter 54 is such that as the arm of the potentiometer is driven from a point near one end of its resistance element to a point near the other end, the counter is driven from "0000" reading through successively increasing readings to "1000." Resistors 60 and 62 constitute a zeroing adjustment potentiometer whereby the point on the resistance element of potentiometer 40 to which arm 38 is driven by the servo system when the adapter voltage input is zero, can be made to correspond exactly to the "0000" position of the counter 54. The resistance element of the potentiometer 40 is connected across the fixed resistor 60 and variable resistor 62 in series with a fixed resistor 66. The arm 67 of the resistor 62 is grounded.

Reference voltage source 70 has a fixed resistor 63 and two variable resistors 64, 65 connected in series across its output. One end of the resistance element of potentiometer 40 and one end of resistor 60 are connected to the arm 69 of resistor 64.

Resistors 63, 64, 65 constitute a calibration network through which a portion of the D.C. reference voltage from source 70 is applied to potentiometer 40. By adjusting resistor 64 which is a coarse calibration control, and resistor 65 which is a fine calibration control, the point on the resistance element of potentiometer 40 to which the arm 38 is driven when the counter 54 is at "1000" can be made to correspond to the full-scale which produces full-scale deflection of pointer 20 at meter scale 22.

If the full-scale reading of the meter 10 is not a decimal quantity such as 1, 10, 100, 1000, etc., then the calibration controls 69, 71 of resistors 64, 65 can be adjusted accordingly. For instance, for a meter indicating 3-volts full-scale, the calibration controls 69, 71 will be adjusted so that counter 54 indicates a digital reading of "300."

During operation of the system, the arm 38 of potentiometer 40 is driven to that point on its resistance element at which the voltage thereat equals the input voltage applied at that point. When the potentiometer setting reaches this point, the counter 54 accurately indicates the value of that voltage.

When the system is being set up, the input at terminals T1, T2 is short circuited, that is, the input signal voltage is zero. The zeroing adjustment potentiometer 67 is adjusted so that the counter reads zero in all its places ("0000"). Then full-scale voltage is applied to the adapter input terminals T1, T2 and calibration adjusting resistors 64, 65 are set so that the counter 54 indicates the value of the applied voltage. In both steps, the potentiometer 40 is driven by the system to a point where the voltage at its arm 38 equals the input voltage, i.e. zero or full-scale value.

By proper choice of gear ratios in gear train 50, the adapter can be provided with over-ranging capability of the order of 10%. Thus if the adapter 25 is connected across a d'Arsonval meter in which pointer 20 is "pegged" against its end stop ST because the current flowing through coil 12 is up to 10% greater than its full-scale rating, the counter 54 will indicate the actual value of the current, even though the full-scale meter reading is then incorrect. Switching of range resistors in the circuit in which the meter is connected will therefore be unnecessary. Furthermore this over-ranging capability makes it possible to obtain an accurate digital reading from the counter when the current through the meter coil is over the rating of the highest range for which switching resistors are available, so that a correct meter reading is unobtainable.

In one practical embodiment of the invention, the DC reference voltage source was a 1.35-volts mercuric oxide cell. Alternatively any one of a variety of other known stable DC voltage sources could have been used. For example, the DC reference voltage source can be a standard cell, or an electronic power supply stabilized by means of a breakdown diode or Zener diode, or a conventional electronic regulator employing a variable resistance vacuum tube or transistor as an active element.

The practical embodiment mentioned above employed a calibration circuit with resistors 63, 64, 65 arranged as shown in FIG. 1. The range of control in terms of the full-scale voltage across the coil 12 of meter 10 was 50-millivolts to 500-millivolts. Motor 45 was a 60-cycle two-phase control motor. The servo amplifier 44 was an AC amplifier of conventional type providing ample gain to control the servo motor. Modulator 36 was a known type of contact modulator, also known as a "chopper." This modulator developed a square wave W having peak-to-peak amplitude equal to the difference between the two DC voltages applied to it. Other types of modulators could have been used, such as a photoelectric chopper, a solid state chopper, or an electronic modulator. As other alternatives, a 400-cycle motor and 400-cycle chopper could have been used for motor 45 and modulator 36 respectively; or a DC amplifier could have been used for amplifier 44; and modulator 36 could have been a DC difference-deriving circuit of known type.

A power supply or power pack 80 energized from an AC line provides power to the modulator 36, amplifier 44 and motor 45. This power supply may be of conventional design supplying DC voltage to operate the amplifier 44, supplying low level AC voltage to operate the chopper or modulator 36, and AC voltage for the fixed phase of the two-phase motor 45.

The input impedance of the adapter 25 at terminals T1, T2 is high, in the order of megohms, so that when it is connected across the meter coil 12, it will have negligible effect on the circuit in which the meter is used. Furthermore, since the input of the device is fully floating with respect to ground for both DC and AC, connecting it across a meter in a circuit which is referenced to ground cannot introduce an error by shunting any part of the circuit to ground.

FIG. 2 shows another adapter 25a which embodies another form of the invention. Components corresponding to those of adapter 25 are identically numbered. Terminals T1, T2 are shown connected to the low-pass filter 32 which is in turn connected to modulator 36a, AC amplifier 44 and demodulator 85. The modulator may be an electromechanical type chopper having a vibrating arm 86 which alternately contacts each of the filter output terminals 33′, 34′ connected to the ends of meter coil 12. The chopper converts the DC voltage drop across the meter coil to an alternating voltage. Modulator 36a may be a chopper of other known type such as a photoelectric chopper or a solid state chopper. The alternating voltage output of the chopper is applied to the AC amplifier 44. The amplifier 44 and modulator 36a are energized by power supply 80a connected to an AC power source. The AC amplifier is a linear feedback amplifier of known type having a stabilized gain.

Demodulator 85 may employ an electronic or solid state rectifier, or alternatively it may use a "synchronous" rectifier, that is, a chopper having two arms that vibrate synchronously; one arm of the chopper being used to modulate and the other arm being used to rectify. In either case, the rectifier 88 is followed by a filter 90 so that the output of the demodulator is a DC voltage. The output of the demodulator is applied to digital voltmeter 54a having a digial reading scale 94. The digital voltmeter may be of a solid state type, stepping switch type, relay type or other known type, and its scale 94 may be of any known type, such as a projection system, electro-luminescent display, a nixie tube display, or a segmented line display.

Potentiometer 95 is a calibration control. This calibration control is shown connected between amplifier 44 and demodulator 85. It may be located elsewhere instead; for example in the demodulator, between rectifier 88 and filter 90. The only requirement is that the overall gain of the system be adjustable so that the full-scale voltage developed across the meter coil 12 is accurately amplified to correspond to the full-scale range of the digital voltmeter 54a. The voltmeter 54a may have a zero setting control 93.

FIG. 3 shows system 25b embodying another form of the invention. A digital voltmeter 54b is connected across the meter coil of d'Arsonval meter 10′. The voltmeter 54b includes a calibration circuit having adjustable coarse and fine controls 69′ and 71′ by means of which the digital indicating scale 94′ of voltmeter 54b can be made to indicate the digit "1" followed by a number of zeros when the pointer 20′ of meter 10′ indicates full-scale deflection on scale 22′ as shown in the drawing. The voltmeter may have a zero setting control 93′. Thus, for example, if the voltage developed across the d'Arsonval meter coil when a current is applied to the input terminals 14′, 15′ of the meter 10′ from an external circuit 110 is 125-millivolts at full-scale deflection of pointer 20′, the calibration controls 69′, 71′ are adjusted so that scale 94′ reads "100.0" millivolts. If the current through meter 10′ is then reduced to be exactly one-half of full-scale value, scale 94′ will read "50.0" millivolts; and so on. The parameters and arrangement of the calibration circuit will depend on the circuit requirements of the particular digital voltmeter selected for system 25b, but the circuit may be similar to those of FIGS. 1 or 2.

FIG. 4 shows instrument 25′ having a single cabinet or casing 120 in which adapter 25 is installed. The digital reading scale 125 of counter 54 is exposed at the front panel 126 of the cabinet. Coarse and fine calibration controls 69, 71 are conveniently located at the front of the cabinet. Zero adjustment 67 is provided for the counter scale 125. Adapter 25a can be installed in a single cabinet or casing in a similar manner. Plug 30 connected to cable 130 has terminals T1, T2 for connecting the adapter to a jack which in turn is connected to terminals of the moving coil in a d'Arsonval meter, as explained in connection with FIG. 1.

FIG. 5 shows another arrangement in which adapter 25″ is housed in two units 135, 137. Unit 135 is provided with mounting means 136 and a bezel so that it can be installed in a rack panel. This unit may contain all components of adapter 25 shown in FIG. 1, except the amplifier 44 and power supply 80, which will be contained in unit 137. The two units are connected together by a cable 140. Adapter 25a may similarly be housed in two units. Cable 130′ is connected to plug 30 having input terminals T1, T2 for connection to a d'Arsonval meter. The digital reading scale 125 of counter 54 is located at the front panel 136. By this arrangement, part of the adapter can be installed on a rack where the scale 125 will be conveniently located, and the unit 135 will occupy minimum space. The power supply and amplifier unit 137 may be remotely located from unit 135.

There have thus been provided several forms of adapters according to the invention. Each adapter operates with a d'Arsonval-type meter to convert the dial and pointer readings of the meter to digital readings providing easier readability and greater accuracy then the indications of the pointer and dial of the associated meter.

While the invention has been described particularly for use in conjunction with a d'Arsonval meter to provide digital indications of DC voltages, it will be apparent to those skilled in the art that the adapter can be used with other DC voltage sources. As explained previously, the adapter provides a digital indication of the DC voltage which is applied across input terminals T1, T2. Thus the adapter will provide a digital reading of any DC voltage which is applied across terminals T1, T2 from a DC voltage source, whether it is a d'Arsonval meter or not.

What is claimed and sought to be protected by Letters Patent is:

1. A digital indicating adapter for a d'Arsonval meter having a moving coil responsive to a direct current applied from an external circuit to move a pointer along a graduated meter scale, comprising a modulator; first circuit means for interconnecting said moving coil and said modulator to apply DC voltage from said coil to said modulator; means in said modulator for producing a substantially square-peaked alternating voltage output in response to the applied DC voltage; a digital indicating device; and second means interconnecting said modulator and said digital indicating device, said device being responsive to said alternating voltage for producing a digital indication corresponding to each position of said pointer along said scale, said second circuit means including adjustable calibration means connected between said digital indicating device and said modulator for producing a particular digital indication by said device when the pointer is deflected full-scale by the d'Arsonval meter, said first circuit means having input terminals floating with respect to ground for both DC and AC voltages to avoid shunting any part of said external circuit to ground.

2. A digital indicating adapter according to claim 1, wherein said digital indicating device is provided with means for displaying an accurate reading even though the current applied to the d'Arsonval meter exceeds by a predetermined amount the current required to effect full-scale deflection of the pointer of the meter.

3. A digital indicating adapter according to claim 1, wherein the first circuit means includes a low-pass filter for removing alternating current voltage components from the DC voltage applied to the modulator from the moving coil.

4. A digital indicating adapter according to claim 1, wherein said digital indicating device has display means including electrically illuminated numerals.

5. A digital indicating adapter according to claim 1, wherein said digital indicating device comprises a mechanical counter having rotating numbered disks, and a servo motor mechanically connected to and driving said counter; said second circuit means further including zero adjustment means so that the counter disks all indicate zeros when the magnitude of the voltage output of the modulator is reduced to zero.

6. A digital indicating adapter for a d'Arsonval meter having a moving coil responsive to a direct current to move a pointer along a graduated scale, comprising a modulator, first circuit means interconnecting said moving coil and said modulator to apply DC voltage from said coil to said modulator, means in said modulator for producing an alternating voltage in response to the applied DC voltage, a digital indicating device comprising a counter having a plurality of rotatable numbered disks for displaying numerals to at least three decimal places, a servo motor mechanically connected to said counter for driving the disks, second circuit means interconnecting said modulator and servo motor electrically for applying alternating voltage of variable amplitude depending on the magnitude of DC voltage applied to the modulator, a reference DC voltage source, and third circuit means interconnecting the reference voltage source and modulator, said third circuit means having zero indicating adjustment means for the counter, said third circuit means further including calibration means for adjusting the magnitude of the reference voltage applied to the modulator, so that the counter disks display a selected numeral when the pointer is deflected full-scale in the d'Arsonval meter.

7. A digital indicating adapter according to claim 6, wherein the first circuit means includes a filter for removing alternating voltage components from the DC voltage applied to the modulator from the moving coil.

8. A digital indicating adapter according to claim 6, wherein the modulator is a chopper having two DC voltage inputs and an output producing a square peaked alternating voltage whose peak-to-peak magnitude is proportional to the difference in magnitudes of the DC voltages applied to the two inputs of the chopper.

9. A digital indicating adapter according to claim 6, wherein the mechanical means connecting the servo motor and counter includes a gear train having such gear ratios that the counter will display an accurate reading even though the current applied to the d'Arsonval meter exceeds by a predetermined amount the current required to effect full-scale deflection of the pointer of the meter.

10. A digital indicating device for indicating numerically magnitudes of applied DC voltages, comprising a modulator; first circuit means including a pair of input terminals in circuit with said modulator for applying DC voltages from an external DC voltage source to said modulator; means in said modulator for producing a substantially square-peaked alternating voltage output in response to the applied DC voltage; a digital indicating device; and second circuit means interconnecting said modulator and said digital indicating device, said device being responsive to alternating voltage for producing a digital indication corresponding to each magnitude of applied DC voltage, said second circuit means including adjustable calibration means connected between said digital indicating device and said modulator for producing a particular digital indication by said device when a certain maximum predetermined DC voltage is applied to said terminals, said input terminals being arranged in a floating relationship with respect to ground for both DC and AC voltages to avoid shunting any part of the external voltage source to ground.

References Cited

UNITED STATES PATENTS

| 2,974,288 | 3/1961 | Norgaard | 324—118 |
| 3,161,454 | 12/1964 | Cann | 318—20.850 |
| 3,175,211 | 3/1965 | Lee et al. | 340—347 |

MAYNARD R. WILBUR, *Primary Examiner.*

J. GLASSMAN, *Assistant Examiner.*

U.S. Cl. X.R.

340—347